United States Patent
Koch et al.

(10) Patent No.: US 8,075,224 B2
(45) Date of Patent: Dec. 13, 2011

(54) METHOD AND DEVICE FOR RECONSTRUCTING OLD UNDERGROUND PIPES

(75) Inventors: Elmar Koch, Eslohe (DE); Martin Köper, Attendom (DE)

(73) Assignee: TRACTO—TECHNIK GmbH & Co. KG, Lennestadt (DE)

( * ) Notice: Subject to any disclaimer, the term of this patent is extended or adjusted under 35 U.S.C. 154(b) by 0 days.

(21) Appl. No.: 12/064,515

(22) PCT Filed: Aug. 18, 2006

(86) PCT No.: PCT/EP2006/008180
§ 371 (c)(1),
(2), (4) Date: Aug. 15, 2008

(87) PCT Pub. No.: WO2007/022925
PCT Pub. Date: Mar. 1, 2007

(65) Prior Publication Data
US 2009/0220305 A1    Sep. 3, 2009

(30) Foreign Application Priority Data
Aug. 22, 2005 (DE) .......... 10 2005 039 790

(51) Int. Cl.
*F16L 55/18* (2006.01)
*F16L 55/165* (2006.01)

(52) U.S. Cl. .......... 405/184.2; 405/184.1; 138/97; 254/29 R

(58) Field of Classification Search ......... 405/184, 405/184.1, 184.2, 184.3, 184.4; 254/29 R; 138/97
See application file for complete search history.

(56) References Cited

U.S. PATENT DOCUMENTS

| | | | |
|---|---|---|---|
| 4,082,248 A | | 4/1978 | Hinrichsen |
| 4,626,134 A | * | 12/1986 | Coumont ............ 405/184 |
| 4,674,914 A | * | 6/1987 | Wayman et al. ......... 405/184.3 |
| 5,013,188 A | * | 5/1991 | Campbell et al. ......... 405/184.1 |
| 5,069,426 A | | 12/1991 | Gabrysch |
| 5,403,122 A | * | 4/1995 | Granella ............. 405/184.3 |
| 5,980,157 A | | 11/1999 | Püttmann |
| 6,129,486 A | * | 10/2000 | Putnam ............. 405/184 |
| 6,238,141 B1 | * | 5/2001 | Puttmann et al. ......... 405/184 |
| 6,244,783 B1 | * | 6/2001 | Puttmann et al. ......... 405/184 |
| 6,364,036 B1 | * | 4/2002 | Puttmann ............. 175/52 |
| 6,491,476 B2 | | 12/2002 | Hesse |
| 2006/0034666 A1 | * | 2/2006 | Wentworth et al. ....... 405/184.3 |
| 2007/0048090 A1 | * | 3/2007 | Wentworth et al. ....... 405/184.1 |

FOREIGN PATENT DOCUMENTS

| | | |
|---|---|---|
| DE | 2 241 695 | 3/1974 |
| DE | 37 03 134 A1 | 8/1988 |
| DE | 19808980 C2 | 5/1998 |
| DE | 199 18 530 A1 | 10/2000 |
| DE | 198 17 873 | 7/2003 |

* cited by examiner

*Primary Examiner* — Frederick L Lagman
(74) *Attorney, Agent, or Firm* — Henry M. Feiereisen; Ursula B. Day

(57) ABSTRACT

A method for in-situ repair of old underground pipes is disclosed. A breaking tool with a drive or a pipe section is pulled from a typical inspection shaft to the next inspection shaft (machine shaft) by a hydraulic piston-cylinder unit which has a housing that is at least partially located inside the old pipe. The extremely limited interior space of the machine shaft is thereby kept essentially free from machine parts.

13 Claims, 4 Drawing Sheets

METHOD AND DEVICE FOR RECONSTRUCTING OLD UNDERGROUND PIPES

BACKGROUND OF THE INVENTION

The invention relates to a method for reconstructing old underground pipes, wherein a breaking or cutting tool connected with a drive or a pipe section is moved through the old pipe from a starting shaft to a destination shaft or machine shaft, or from a starting ditch to a destination ditch or a machine ditch.

The state of the art is replete with static methods for trenchless reconstruction and/or replacement of pipes buried underground. In one of these methods, a spitting tool is pulled through the old pipe for replacing the pipe while retaining the original routing. The spitting tool is used to fragment, for example comminute, the old pipe and if necessary, to simultaneously widen the resulting underground bore hole which receives the fragments from the old pipe.

Such systems are described, for example, in the German Patents 196 08 980 C2 and 198 17 873 C2; they consist essentially of a sled which can be moved on a carriage by a hydraulic cylinder piston drive. The sled is includes latches which are configured to engage during a forward stroke of the hydraulic cylinder with rungs of a ladder framework consisting of individual segments. A breaking or cutting tool for demolishing the old pipe can be arranged at the free end of the ladder framework and used for simultaneously widening the created underground bore hole and/or for pulling in a new pipe section.

Drive units of this type have met with overwhelming success; however, they require a machine shaft or a machine ditch having dimensions commensurate with the dimensions of the drive unit and must leave sufficient space at the rear of the system so that a corresponding rod section can be coupled to the end of the rod assembly which protrudes from the rear end of the system. For example, when replacing old pressure and drainage pipe between a typical drainage or inspection shaft and the immediately adjacent shaft having a standard a diameter of only 100 cm, the drive unit occupies considerable space of the unobstructed shaft cross-section, which is then no longer available for the required work, for example for handling the rod sections and attaching the rod sections to the end of the rod assembly.

Moreover, time-consuming and expensive removal of the so-called channel from the shaft is required in order to provide the space for inserting and positioning the drive unit. The channel is approximately U-shaped in cross-section and is frequency tiled. The channel is aligned with the opposing openings at the pipe ends, and is used to direct the drainage water through the shaft.

Due to their space requirements, even short drive units cause space problems when coupling the rod sections to the rod assembly and connecting them to the rear end of the run to withstand push and pull forces. The length of the rod sections is therefore limited to approximately 50 cm. In addition, even short drive units cannot be used in a shaft, where the extension of the old pipe axis is not substantially aligned with the shaft diameter or runs through the shaft axis, but rather intersects the shaft as a secant, because miniaturization has limits due to design constraints and in view of the required large drive power.

When replacing a pipe from one ditch to the next, the space problems can be solved by enlarging the ditches. However, this requires commensurate soil excavation resulting in additional costs for labor, machines, transport and storage for the excavated soil.

The same problems associated with pipe replacement also occur in pipe reconstruction, where a new pipe made of individual pipe sections is pulled trough the old pipe, with tight clearance to the wall of the old pipe, wherein the length of the new pipe sections corresponds approximately to that of the rod sections.

SUMMARY OF THE INVENTION

In view of this background, the problem to be solved by the invention is to provide a method which leaves a greater unobstructed space in a predetermined shaft (standard shaft) or requires a smaller ditch than with conventional methods and drive units (rod drive).

The invention solves this problem by arranging the rod drive at least partially in the old pipe. In this way, the unobstructed space behind the drive is enlarged to the same extent as the drive is inserted in the old pipe end terminating in the shaft. Correspondingly more work space is available. Moreover, the rod or pipe sections can be longer commensurate with the gained unobstructed space and/or even those old pipes can be replaced whose extended axis is not aligned with the shaft axis, but intersects the shaft as a secant.

Another particular advantage of the invention is that the channel need no longer be demolished or removed, and no new channel needs to be installed after the pipe has been restored.

The rod drive, preferably a hydraulic-piston-cylinder unit, can be arranged in a pipe liner which can be easily inserted in the end of the old pipe. The pipe liner can be locked in place at that location or on the outside. This pipe liner can be used as a thrust bearing for the rod which consists of individual sections and can, for example, be supported on the shaft wall by thrust bearing shield. This obviates the need for a conventional thrust bearing supported in the shaft by braces, thus freeing up even more space.

The drive unit is preferably arranged in a tubular housing having a groove disposed at its rear end, with a latching fork engaging in the groove. During operation, the latching fork contacts the thrust bearing shield and fixes the drive unit and the pipe liner by applying a pull force to the rod assembly.

A front support element for a rod locking device may be connected with the housing, the drive unit or with the pipe liner, preferably via braces, whereby the rod locking device prevents the rod assembly with a pulled tool or a pipe section from moving backwards when the rod is decoupled from the drive during retraction of the piston of the drive unit and a force is no longer applied.

The piston rods of the drive unit are preferably connected with a support element for at least one movable pull finger and at least one likewise movable push finger. The fingers serve as coupling means and can alternatively be positioned so that they are in driving engagement with the rods. In their working position, the fingers can preferably be moved by a spring force with the help of a locating ring which can rotate and also move in an axial direction and is in driving engagement with the movable fingers. The locating ring can have a slot oriented at an angle with respect to the pipe or device axis, with a guide and driver pin engaging in the slot. Either the push fingers or the pull fingers move centripetally through rotation of the locating ring until the pin contacts the stop in the slot, while the inwardly pivoted fingers are brought into their respective engagement position through further rotation of the locating ring.

Within the scope of the invention, restoration of old pipes is to be understood as including any type of underground pulling or pushing operation, both for old pipes and new pipes as well as for widening of bore openings.

BRIEF DESCRIPTION OF THE DRAWING

The invention will now be described in more detail with reference to an exemplary embodiment depicted in the drawing. It is shown in.

DETAILED DESCRIPTION OF PREFERRED EMBODIMENTS

Figure 1:
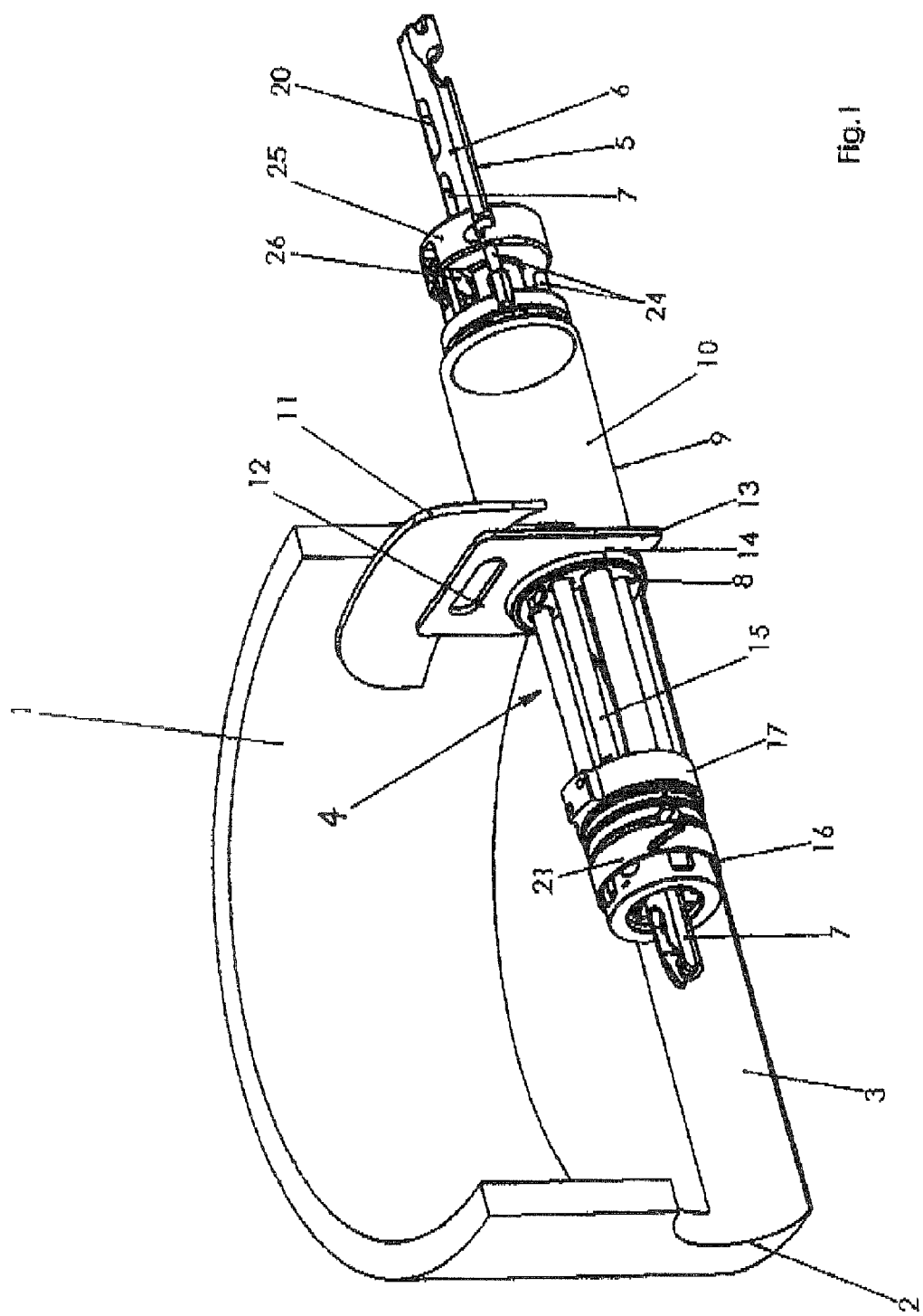
FIG. 1 a perspective partial view of a breaking device according to the invention in situ, FIG. 2 a perspective partial view of the rear end of the spitting device with the pull fingers in the operating position, FIG. 3 a diagram corresponding to FIG. 2 with the push fingers in the operating position, and FIG. 4 the device with retracted piston rods.
Figure 2:
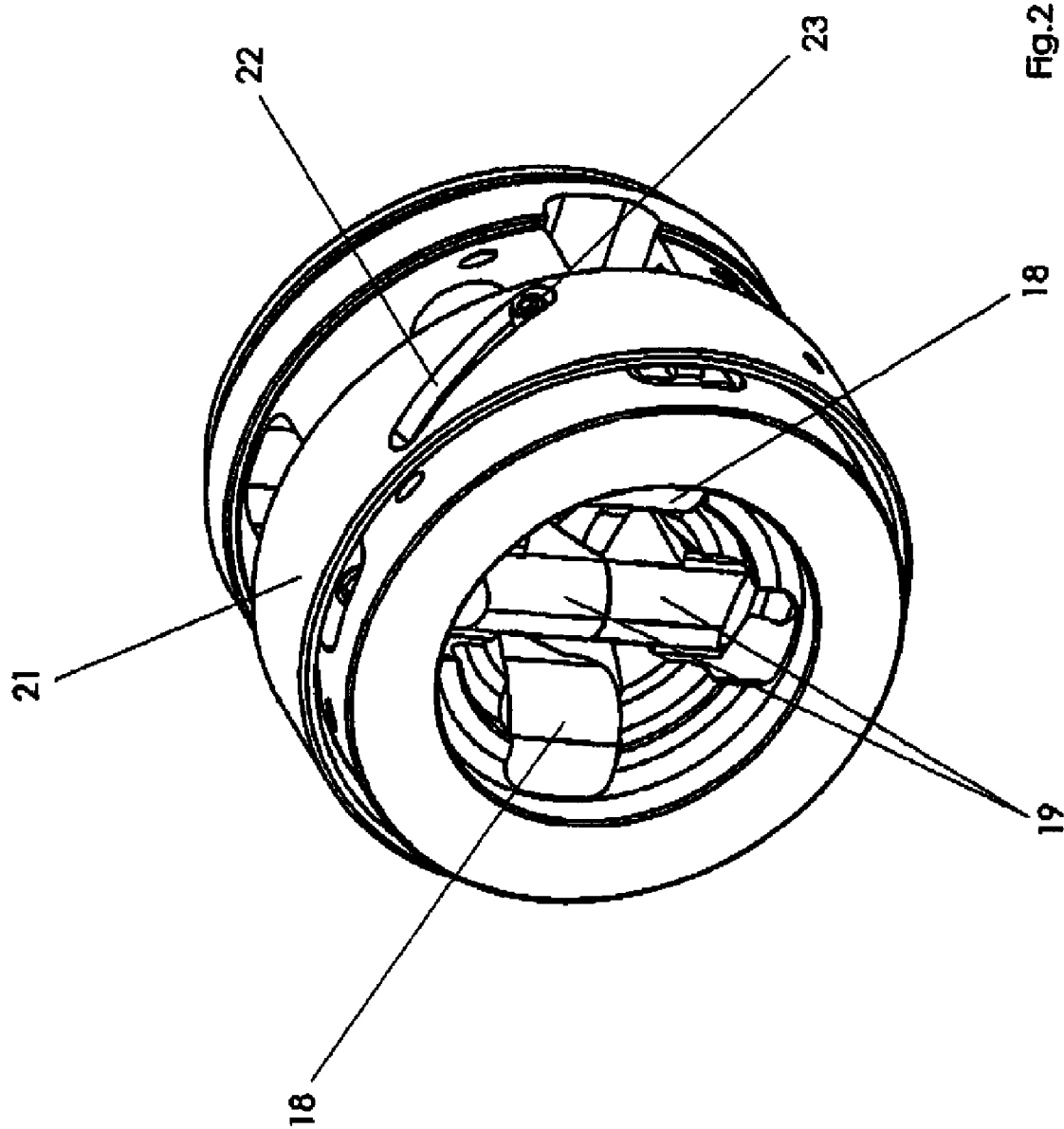
Figure 3:
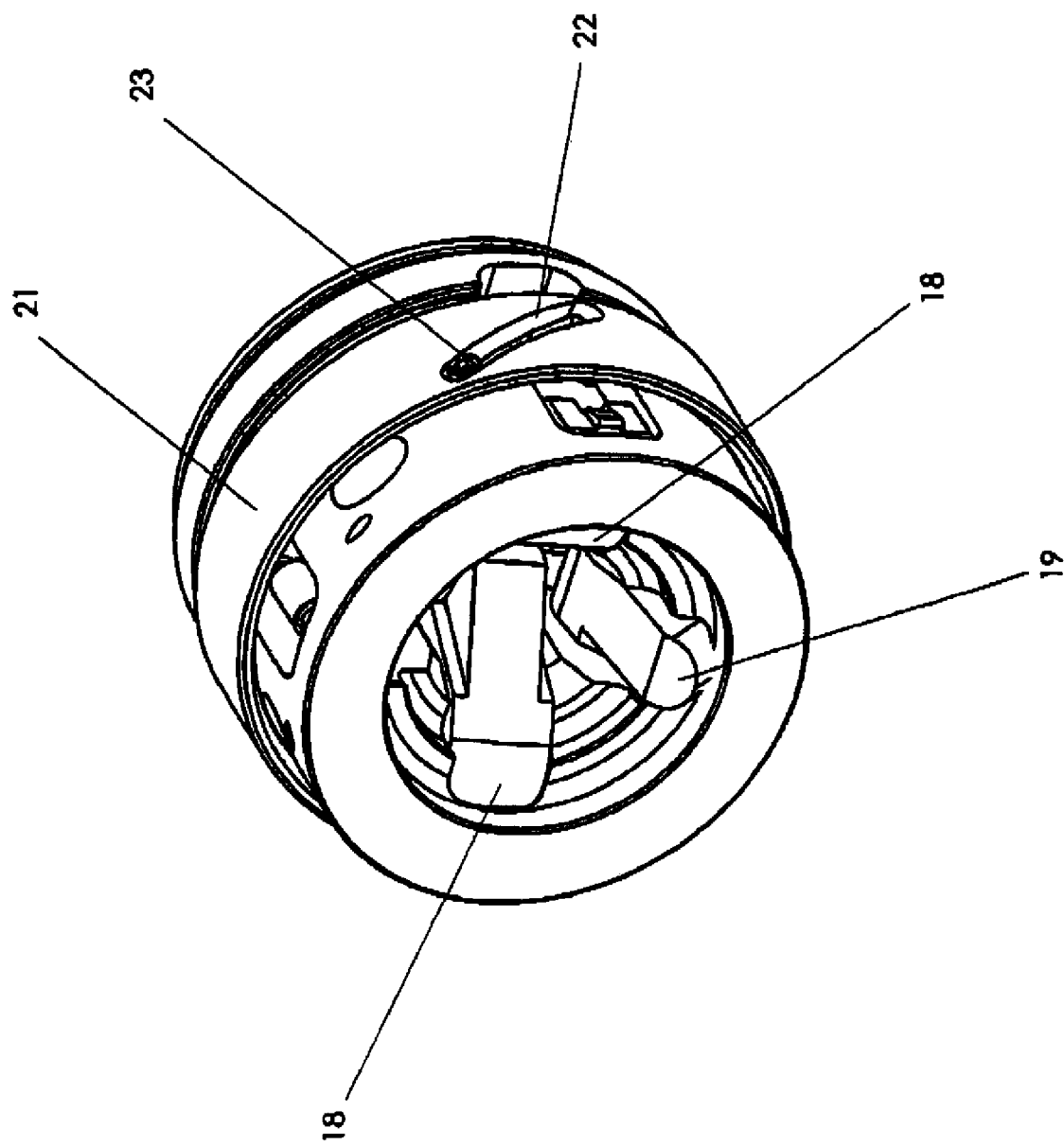

In a machine shaft 1 configured as a typical inspection shaft with two coaxially opposing end openings 2 for a pipe, there are arranged a channel 3 and the rearward section of a linear drive or push and pull unit 4 for a rod assembly 5 consisting of individual rod sections 6 and 7 which are releasably connected by way of a catch coupling, as disclosed in German Offenlegungsschrift 199 18 530 A1. The channel can here be preserved. It is not necessary to support the drive unit in the shaft, in particular if the center of gravity of the drive unit is located inside the old pipe. The end of the rod assembly 5 located opposite the drive unit is provided with a breaking or cutting tool or a pipe section (not shown) and extends coaxially through the tubular housing 8 of a hydraulic-piston-cylinder unit (not shown). The drive unit is composed of several hydraulic cylinders arranged in parallel, for example four pull cylinders and two push cylinders for inserting a rod assembly without a tool or pipe section. The housing 8 of the drive unit is configured as a plug housing and is located in a pipe liner 9, wherein the section 10 of the pipe liner 9 located outside the shaft protrudes into the end of the old pipe (not shown). The pipe liner is fixedly connected with a thrust bearing shield 11, while a latching fork 13 having a handle opening 12 engages in an annular groove 14 in the drive housing.

The piston rods 15 of the hydraulic drive support at their free ends a coupling head 16 with a distributor ring 17 for supplying a hydraulic fluid to the piston-cylinder units via respective hydraulic lines arranged between the coupling head 16 and the piston rods in the hydraulic cylinders. Rotatable finger pairs 18, 19 which can be alternatively operatively connected with the rod assembly 5 are arranged inside the coupling head 16. The pull finger pairs 19 engage with openings 20 in the rod assembly during the work stroke, i.e., while the piston rods 15 are extended, until they slide over the rod assembly openings 20 as drag fingers when the piston rods 15 are retracted or during the return stroke following the stroke reversal. The push fingers 18 operate similarly in a reversed fashion, when the device is operated, for example, during insertion of a rod assembly 5 without a tool or pipe section.

The finger pairs are pivoted into their engagement position by tension springs, when a locating ring 21 is rotated manually. A pin 23 fixedly mounted on the device and engaging in a slot 22 operates on the locating ring as a rotation limit stop and as a catch pin for an inner ring on which the fingers are mounted after the pin reaches its end position in the slot. While the locating ring of the coupling head 16 operates the finger pairs, which are moved by tension springs into their working or engagement position, the locating ring and the inner ring move the fingers with a common 90° rotation into a position above the assembly openings. The interior ends of the fingers have noses which can be rotated and axially adjusted in grooves and on raised portions abutting inclined surfaces disposed on the interior side of the locating ring.

Figure 4:
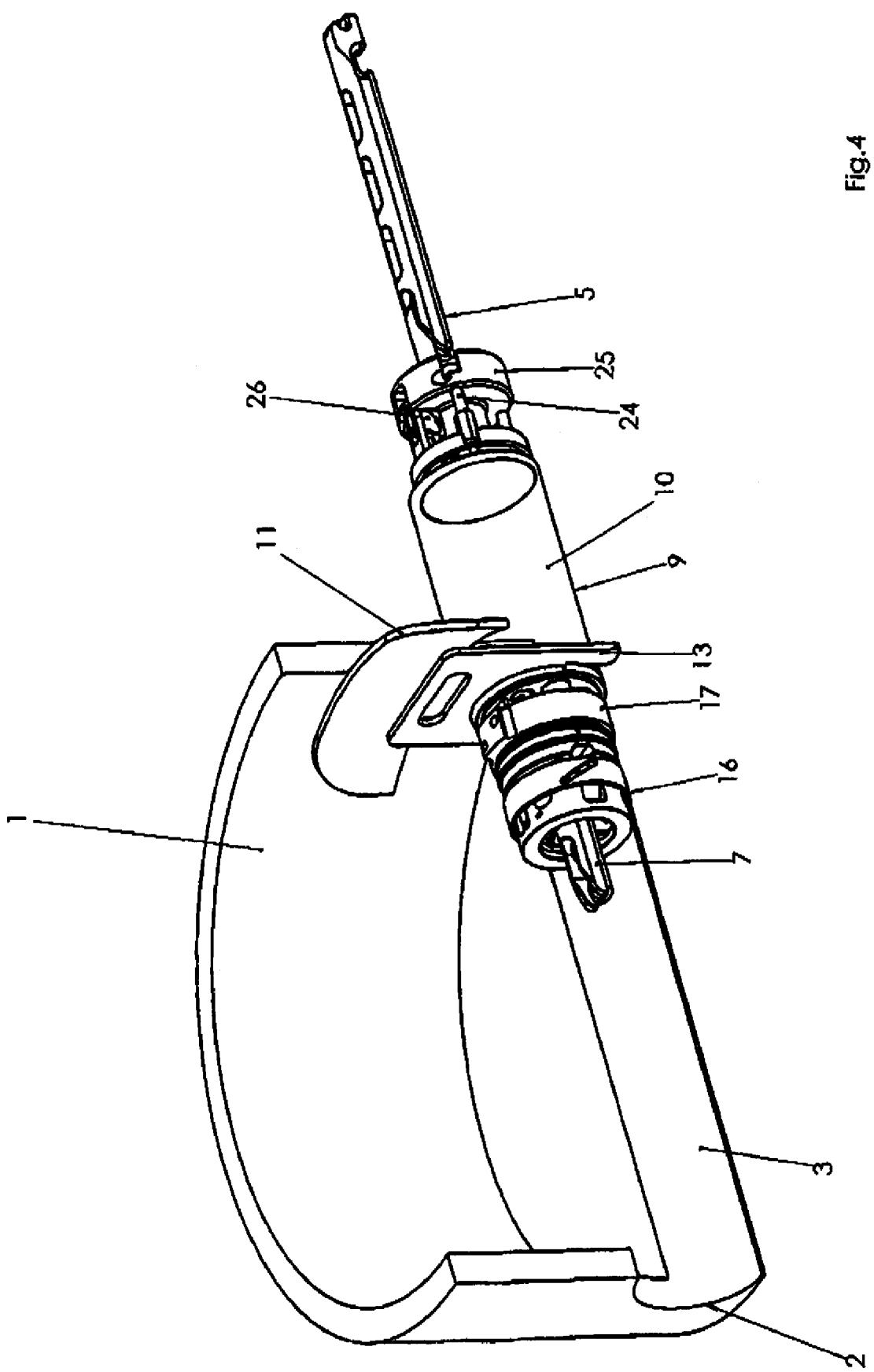

The pull fingers 19 pull the rod assembly 5 in the direction of the shaft 1 when the cylinder piston 15 is extended, while the push fingers 18 move the rod assembly toward the soil when the piston rods are retracted (FIG. 4).

The device therefore has to operating directions, for example for pooling a spitting head through the old pipe when the piston rods 15 are extended, or only of the rod assembly 5 to the start shaft (not shown) during insertion.

To prevent, when pulling a tool, a return motion of the rod assembly 5 during the retraction of the piston rods 15 or the return stroke of the hydraulic cylinder, the end of the device located in the old pipe includes a support element 25, which is stationary and/or connected with the pipe liner 9 or the housing 8 via braces 24 to provide a releasable rod assembly lock 26, which fixes the rod assembly during the cylinder return stroke.

The drawings clearly indicate that only between a quarter and a third of the drive unit is located inside the shaft. Accordingly, the unobstructed space behind the unit is enlarged by the distance between the shaft wall and the front of the support element 25. It is therefore possible to couple correspondingly longer rod sections 6, 7 to the end of the rod assembly 5 protruding from the coupling head 16.

The unobstructed space can also be enlarged compared to conventional methods by supporting the device by the thrust bearing shield 11 and the latching fork 13 on the shaft wall in a simple manner, so that thrust bearing braces are not required, as is customary with conventional devices and methods.

What is claimed is:

1. A method for reconstructing an old underground pipe, comprising the steps of:
   placing a rod drive at least partially inside the old pipe; and
   pulling a tool or a pipe section connected to the rod drive via a rod assembly from a start shaft to a destination or machine shaft,
wherein the rod drive is arranged inside a pipe liner which protrudes into the old pipe.

2. The method of claim 1, and further comprising the step of affixing a thrust bearing shield to the pipe liner.

3. The method of claim 1, wherein the rod drive is fixedly installed in the pipe liner.

4. The method of claim 1, and further comprising the steps of connecting a plurality of rod sections via catch couplings to form a rod assembly, and placing the rod assembly between the tool or an old pipe section and the rod drive.

5. A device for reconstructing an old underground pipe, comprising:
   a linear push-pull rod drive having one or more hydraulic cylinders, each of said hydraulic cylinders having
   a stationary section comprising a cylinder having a proximal section located near an interior wall of a destination or machine shaft and a distal section extending into the old underground pipe; and
   a piston movable in the stationary section and extending into the destination or machine shaft, said piston forming a movable section of the push-pull rod drive;
   coupling means connected to the movable section of the push-pull rod drive and constructed for engagement with a rod assembly; and a thrust bearing shield placed against an interior wall of the destination or machine shaft, said thrust bearing shield being connected to the proximal section of the push-pull rod drive to prevent movement of the stationary section of the rod drive when the rod drive applies a pulling force to the rod assembly in order to pull a tool or pipe section from a start shaft to the destination or machine shaft.

6. The device of claim 5, wherein the rod assembly includes a plurality of rod sections connected to one another by catch couplings.

7. The device of claim 5, further comprising a pipe liner protruding into the old pipe, wherein the push-pull rod drive is arranged inside the pipe liner.

8. The device of claim 7, further comprising a support element and a latch connected with the pipe liner and configured to latch with the rod assembly.

9. The device of claim 7, wherein the thrust bearing shield is fixedly connected with the pipe liner at a proximal end of the pipe liner located in the destination or machine shaft.

10. The device of claim 5, further comprising a plug housing, wherein the push-pull rod drive is arranged inside the plug housing.

11. The device of claim 10, further comprising a locking device for attachment to the plug housing.

12. The device of claim 11, wherein the locking device comprises a locking fork engaging with a groove disposed on an outside surface of the plug housing.

13. The device of claim 10, further comprising a support element and a latch connected with the plug housing and configured to latch with the rod assembly.

* * * * *

UNITED STATES PATENT AND TRADEMARK OFFICE
CERTIFICATE OF CORRECTION

| | | |
|---|---|---|
| PATENT NO. | : 8,075,224 B2 | Page 1 of 1 |
| APPLICATION NO. | : 12/064515 | |
| DATED | : December 13, 2011 | |
| INVENTOR(S) | : Elmar Koch and Martin Köper | |

It is certified that error appears in the above-identified patent and that said Letters Patent is hereby corrected as shown below:

ON THE TITLE PAGE:

Item (56) References Cited under "FOREIGN PATENT DOCUMENTS":

replace "DE 19808980 C2" with -- DE 19608980 C2 --.

Signed and Sealed this
Twenty-first Day of February, 2012

David J. Kappos
*Director of the United States Patent and Trademark Office*